April 20, 1965   M. A. LINDEMAN ETAL   3,179,193
FUEL WEIGHING DEVICE
Filed March 26, 1963

Start

Stop

INVENTORS.
MYRL A. LINDEMAN
WILLIAM B. HANSEL
BY

George L. Church
ATTORNEY

United States Patent Office 3,179,193
Patented Apr. 20, 1965

3,179,193
FUEL WEIGHING DEVICE
Myrl A. Lindeman, Newtown Square, and William B. Hansel, Media, Pa., assignors to Sun Oil Company, Philadelphia, Pa., a corporation of New Jersey
Filed Mar. 26, 1963, Ser. No. 268,198
8 Claims. (Cl. 177—229)

This invention relates to a fuel weighing device, and more particularly to a device for accurately weighing the liquid fuel used by an internal combustion engine, during a test run thereof.

The testing of automotive engines, or of automotive fuels, etc., is commonly carried out on a weight (in pounds) basis; e.g., the air-fuel ratio of the engine is commonly expressed in pounds of air per pound of fuel. It is therefore desirable to weigh the fuel used by an engine while it is operating or running; this may be done by measuring the time required for the engine to consume a predetermined amount (measured in pounds) of fuel.

Prior fuel weighing devices utilize spring scales, or beam balance scales; the pivot points of the latter involve friction, while the springs of the former involve elastic hysteresis or "set." Both of these factors tend to introduce errors into the weight readings. Also, these prior devices utilize flexible lines or hoses coupled to the fuel tank being weighed; these lines involve friction or "pull" on the tank, and thus also tend to introduce errors into the weight readings.

An object of this invention is to provide a novel fuel weighing device.

Another object is to provide a fuel weighing device which does not utilize any pivot points (knife edges), or any flexible lines, hoses, or wires, in the weighing system.

A further object is to provide a fuel weighing device which involves no friction whatever in the weighing system.

The objects of this invention are accomplished, briefly, in the following manner: The fuel line and the vent line to a sealed fuel container or tank are thin-walled tubes which provide a cantilever type support for the container, one end of the tubes being rigidly secured to the container and the other end of the tubes being fixedly mounted or clamped. The deflections or vertical displacements of the container and tubes, caused by fuel added to or removed from the container, are sensed or detected by a core-and-coil arrangement which forms a differential transformer. The output of the transformer is amplified and indicated on a large calibrated dial scale, by means of a conventional servo mechanism.

Figure 1:
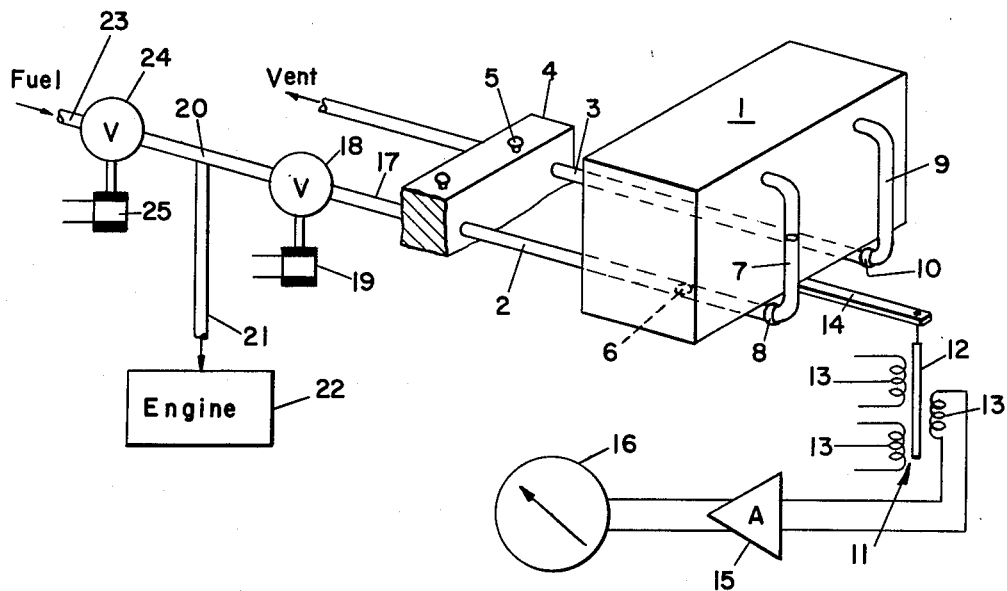
Figure 2:
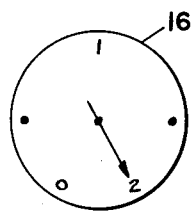
Figure 3:
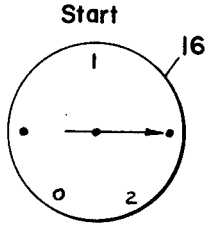
Figure 4:
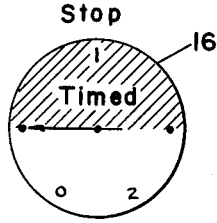

A detailed description of the invention follows, taken in conjunction with the accompanying drawings, wherein:

FIG. 1 is a somewhat schematic illustration of the fuel weighing device of the invention, incorporated into a fuel system for an engine; and FIGS. 2-4 are views of the face of the fuel weight indicator, at various stages during a typical engine test.

Referring first to FIG. 1, a container 1, which is entirely sealed, serves as a tank in which the fuel is weighed. The container 1 is supported by a cantilever type support which comprises two thin-walled pieces 2 and 3 of metal tubing. The elongated rigid tubular members 2 and 3, which are substantially horizontal, are rigidly secured at one end thereof (e.g., by soldering) to the bottom of container 1, and adjacent the other end thereof are fixedly mounted in position by a clamping means 4, which also serves as a fulcrum. The container 1 is thus supported solely by the tubular members 2 and 3, which may for example be pieces of thin-walled ¼-inch O.D. stainless steel tubing. The diameter of the tubing used is of course governed by the fuel weight to be measured, giving consideration to the fact that the free or container ends of the tubes are to be deflected vertically as fuel is added to or removed from the tank 1. In practice, the clamping means 4 may comprise a metal block secured to the vertical wall of a cabinet or other suitable vertically-extending support, the tubes 2 and 3 being firmly secured to this block as by means of set screws 5.

The tubular members 2 and 3, in addition to serving as cantilever beams supporting the tank 1, serve as fluid lines for the tank. Tube 2 serves as the tank fuel line (liquid flow means), for adding fuel to or removing fuel from the tank, and for this purpose communicates with the interior of the tank by means of a fill and drain hole 6 which extends through the bottom wall of the tank and through only the upper portion of the wall of tube 2. A tube 7 of transparent plastic material (the material known commercially as "Tygon," for example) is coupled at 8 to the tank end of tube 2, and extends upwardly from this coupling to the upper portion of tank 1, to connect the tube 2 also to the upper portion of the tank. Tube 7 thus provides a sight glass, to indicate fuel level in the tank.

Tube 3 serves as the tank venting means or vent line; this line extends out through the clamping means 4 to a suitable vent, as indicated, preferably by way of a "quick disconnect" fitting (not shown). For venting the tank, a tube 9 of transparent plastic material (preferably the same material as that of tube 7) is coupled at 10 to the tank end of tube 3, and extends upwardly from this coupling to the upper portion of tank 1, to connect the tube 3 to the upper portion of the tank. Tubes 3 and 9, in combination, thus provide venting means for the sealed container 1.

In order to sense vertical displacements of container 1 (and also, of course, of tubes 2 and 3), a differential transformer 11 may be utilized, this transformer being more or less conventional and including a core 12 of ferromagnetic material which is arranged for movement with respect to several cooperating coils 13. Core 12 is attached to the outer or free end of a member 14 whose other end is rigidly secured (as by soldering, for example) to the bottom of container 1. Thus, as container 1 moves up and down when fuel is removed from or supplied to the same, member 14 and core 12 also move up and down. Typically, core 12 may move 0.1 inch vertically for a complete filling or emptying of the tank, involving say two pounds of fuel. The deflection of the cantilever beams (tubes) 2 and 3, caused by fuel being added to or removed from the tank 1, is sensed by differential transformer 11; the resultant signal is amplified by amplifier 15 and applied to an indicator 16 (having a pointer cooperating with a large calibrated dial) by way of a conventional, standard servo mechanism (not shown). The dial of indicator 16 is calibrated in pounds of fuel, for example from zero to two.

Although not illustrated in FIG. 1, the core 12 is adjustably secured to member 14, so that the core may be set to a position wherein the indicator reads "zero" when the tank 1 is empty (thereby compensating for the empty or "tare" weight of the tank 1 and tubes 2 and 3).

In a practical device, all of the components so far described (to wit, the clamping means 4, the tubes 2 and 3, the container 1, the differential transformer 11, the amplifier 15, and the indicator 16) would be positioned inside a cabinet. This cabinet would be provided with three or more leveling screws which would enable the cabinet to be leveled (as indicated by a "bull's-eye" level bubble mounted inside the cabinet) on a table or other supporting surface. This would enable the cantilever tubes 2 and 3 to be leveled or brought to a horizontal position, which is desirable.

Beyond or on the side of clamp 4 opposite tank 1, the tube 2 is coupled to a tube 17 (e.g., a length of plastic tubing) extending to one side of a solenoid-operated valve 18 which may be termed a "weighed fuel valve." The solenoid coil 19 of valve 18 is electrically connected to a manually-operated on-off switch (not shown), by appropriate operation of which valve 18 may be selectively opened or closed. The other side of valve 18 is coupled to one of the two aligned arms of a T 20 whose right-angled arm is coupled through a "quick disconnect" fitting (not shown) to a fuel line 21 which feeds fuel to an engine 22.

A fuel supply line 23, coming from a suitable fuel supply, is coupled through a "quick disconnect" fitting (not shown) to one side of a solenoid-operated valve 24 which may be termed a "supply valve." The solenoid coil 25 of valve 24 is electrically connected to a manually-operated on-off switch (not shown), by appropriate operation of which valve 24 may be selectively opened or closed. The other side of valve 24 is coupled to the other of the two aligned arms of the T 20.

It may be seen that the "quick disconnect" fittings mentioned couple the fuel weighing device of this invention into a standard engine fuel system. When valves 24 and 18 are both open, engine 22 and tank 1 are supplied with fuel, from the supply line 23; the fuel flow to the tank takes place via elements 20, 18, 17, 2, and 6, with outflow venting taking place via elements 9 and 3. Closing of the weighed fuel valve 18 causes engine 22 to be fed from supply line 23, in a normal manner. With the supply valve 24 closed and the weighed fuel valve 18 open, engine 22 uses fuel from the weighing tank or container 1.

When a determination of the engine fuel consumption rate is to be made, fuel is run into tank 1 (by proper operation of valves 24 and 18) until it is filled, the indicator 16 then indicating two pounds of fuel, as illustrated in FIG. 2. Then, valve 24 is closed (valve 18 remaining open), causing fuel to be fed to the engine from tank 1. The pointer of indicator 16 then moves downscale. When it reaches the position illustrated in FIG. 3 (to wit, an indication of 1.5 pounds), a stop watch is started to begin the timing. When the pointer of indicator 16 reaches the position illustrated in FIG. 4 (to wit, an indication of 0.5 pound), the stop watch is stopped to end the timing, the timed interval thus covering the cross-hatched area of the scale in FIG. 4. Then, valve 18 is closed (although, strictly speaking, this is not essential) and valve 24 is opened, so that the engine can remain running on the fuel supplied by line 23. The stop watch reading then indicates the time required for consumption of a predetermined amount of fuel (in the example given, this amount is one pound). Hence, the fuel consumption rate of the engine, in pounds per hour, can be accurately determined, by a simple calculation.

Instead of the differential transformer arrangement 11–13, various other means for sensing vertical displacements of container 1 (and of the cantilever beams 2 and 3) could be utilized.

The invention claimed is:

1. A liquid fuel weighing device, comprising a container, a cantilever type support for said container comprising an elongated substantially horizontal rigid tubular member fixedly mounted adjacent one end thereof and rigidly secured adjacent its other end to said container, the bore of said tubular member communicating with the interior of said container; and means coupled to said container for sensing vertical displacements of said container.

2. A device as defined in claim 1, wherein said member is a length of thin-walled tubing, and wherein said container is supported solely by said tubing.

3. A device as defined in claim 1, wherein said container is substantially entirely sealed, and wherein said support comprises a pair of tubular members, with one serving as venting means and the other as liquid flow means for said container.

4. A device as defined in claim 1, wherein said support comprises two lengths of thin-walled tubing, with one serving as venting means and the other as liquid flow means for said container; and wherein said container is supported solely by said tubing.

5. A device as defined in claim 1, wherein said sensing means includes a core of ferromagnetic material mechanically coupled to said container and arranged for movement with respect to a cooperating coil.

6. A device as defined in claim 1, wherein said support comprises two rigid tubular members rigidly secured to the bottom of said container, one of said members communicating with the interior of said container at the bottom thereof and also communicating with the interior of said container adjacent the top thereof, and the other of said members communicating with the interior of said container adjacent the top thereof.

7. A liquid fuel weighing device, comprising a sealed container, a pair of substantially horizontally disposed metallic tubes rigidly secured to the bottom of said container externally thereof, one of said tubes communicating with the interior of said container at the bottom thereof and also communicating with the interior of said container adjacent the top thereof, and the other of said tubes communicating with the interior of said container adjacent the top thereof; means fixedly mounting both of said tubes at points spaced from said container, whereby said tubes serve as cantilever type supports for said container; and means coupled to said container for sensing vertical displacements of said container.

8. A device as defined in claim 7, wherein said sensing means includes a core of ferromagnetic material mechanically coupled to said container and arranged for movement with respect to a cooperating coil.

References Cited by the Examiner

UNITED STATES PATENTS

| | | | |
|---|---|---|---|
| 1,800,640 | 4/31 | Jehle et al. | 73—113 |
| 2,669,869 | 2/54 | Weber | 73—113 |
| 2,672,754 | 3/54 | Kent | 73—113 |
| 2,816,750 | 12/57 | Martin | 177—229 |
| 2,880,985 | 4/59 | Roberts | 177—210 |
| 3,077,940 | 2/63 | Blodgett et al. | 177—211 X |
| 3,105,565 | 10/63 | Pischinger | 177—190 |
| 3,107,743 | 10/63 | Knobel | 177—229 X |

LEYLAND M. MARTIN, *Primary Examiner.*

LEO SMILOW, *Examiner.*